Dec. 14, 1965         S. D. CAPPOTTO ETAL         3,223,219
       ON-OFF SWITCH WITH COVER INTERLOCK AND OVERRIDING
                       MEANS FOR TYPEWRITER
Filed April 5, 1962                         6 Sheets-Sheet 2

INVENTORS
Samuel D. Cappotto
Everest C. Hunter
BY
ATTORNEYS

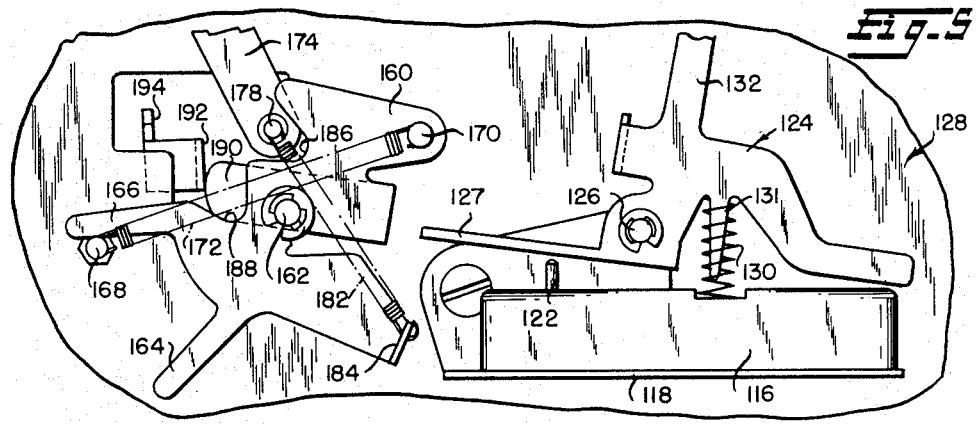
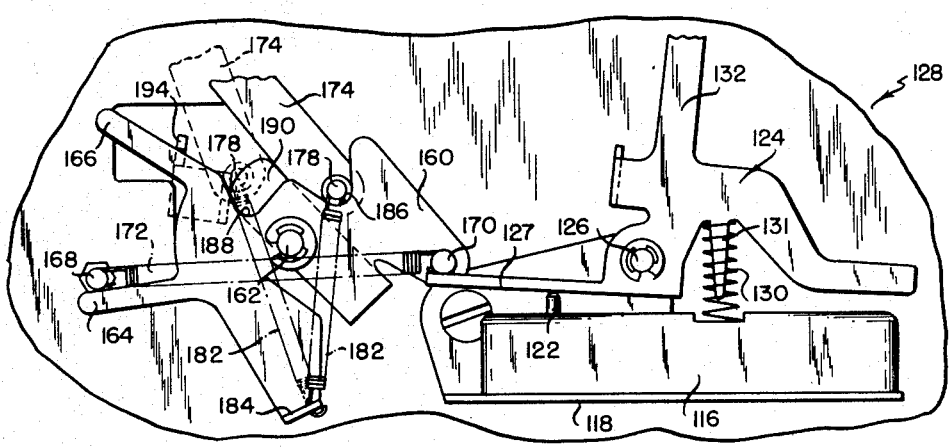
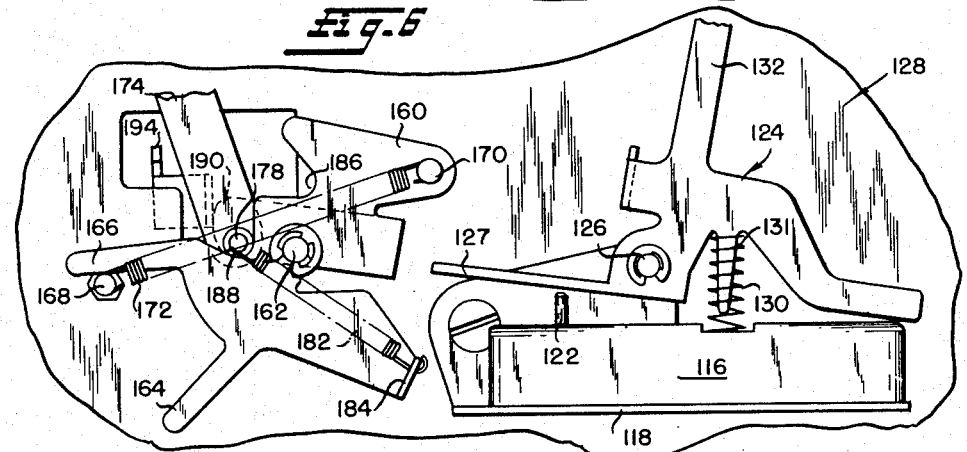

INVENTORS
Samuel D. Cappotto
Everest C. Hunter
BY
ATTORNEYS

INVENTORS
Samuel D. Cappotto
Everest C. Hunter
ATTORNEYS

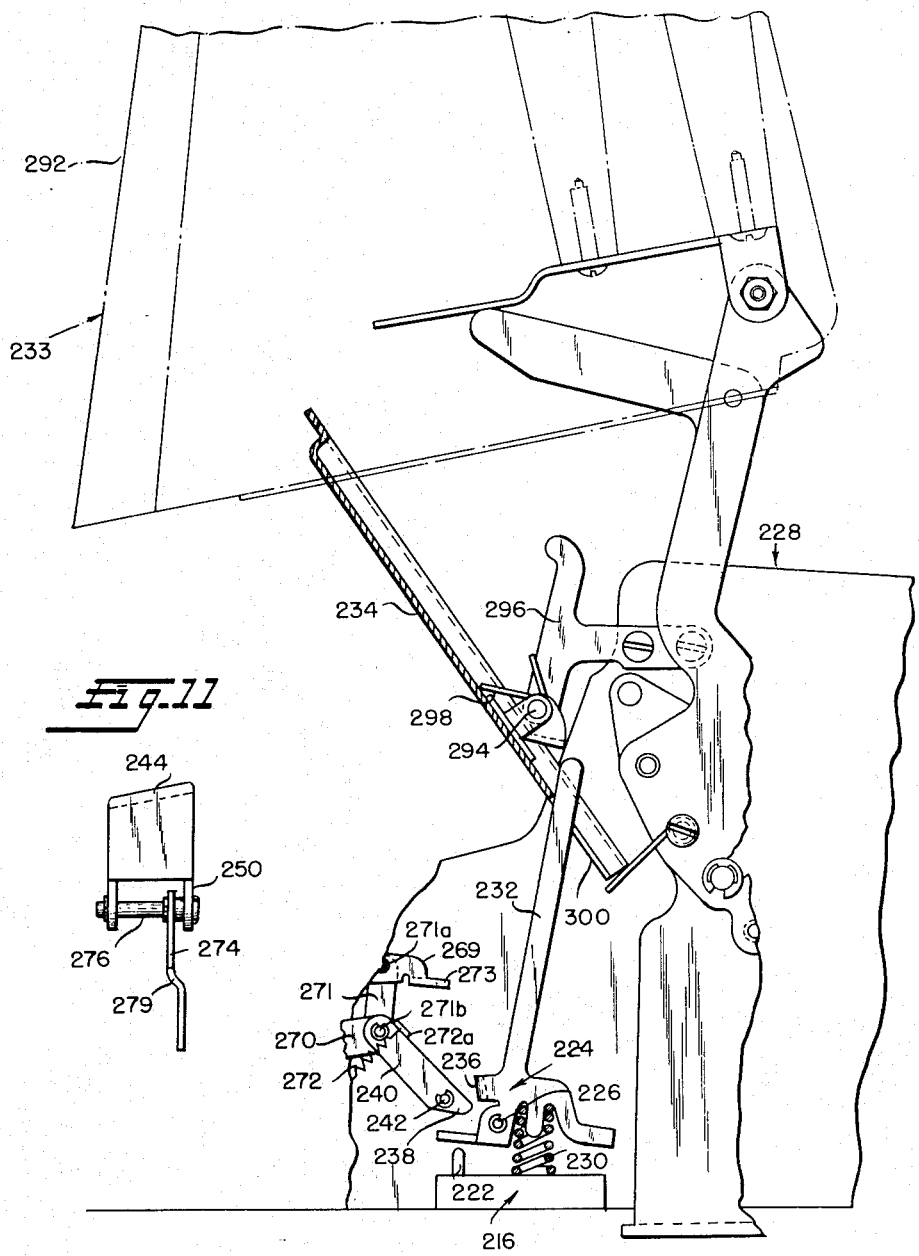

United States Patent Office 3,223,219
Patented Dec. 14, 1965

3,223,219
ON-OFF SWITCH WITH COVER INTERLOCK AND
OVERRIDING MEANS FOR TYPEWRITER
Samuel D. Cappotto and Everest C. Hunter, Syracuse,
N.Y., assignors to SCM Corporation, a corporation of
New York
Filed Apr. 5, 1962, Ser. No. 185,408
13 Claims. (Cl. 197—12)

The present invention relates to improvements in power driven keyboard actuated office machines and in the illustrated embodiments to typewriters.

Specifically, the present invention relates to improvements in mechanisms for controlling the electrical power input to the motors of the power drives of such machines.

The manually actuatable elements which the operator of office machines of this type must manipulate to turn the machines on or off have taken a variety of forms and have been located in a variety of positions on the machines. In prior machines, these elements have been inconvenient to reach and actuate, unpleasant to touch, unsightly, or a combination of all three. The recent trend has been to provide actuators in the form of disks or wheels which are rotated or pivoted back and forth between limit positions corresponding to off and on. An on-off element requiring movement in one direction to turn the machine on and in the opposite direction to turn it off is awkward and more time consuming to manipulate than one which will turn the machine on and off with alternate successive like motion by the operator. On some machines, these disks are located beneath one corner of the casing at a front corner of the keyboard. In such arrangements, visual indication of whether or not the machine is on is provided by permitting inspection of a portion of the disk through a window in the keyboard. This does not provide a clear and attention attracting indication that the machine is on and is usually ignored by operators. In others the disks are located at the cover immediately behind and above the keyboard. While the status of these latter is more clearly visible, they tend to detract from the appearance of the machine or are generally not suitable for use in machines having covers constructed as disclosed in co-pending application Serial No. 78,980, filed Dec. 28, 1960 for Ribbon Spool Cover Suspension Mechanism by Anthony N. Paone (which is now Patent No. 3,123,196) where a movable mask is provided to give complete access to the typebasket and ribbon mechanism for ease in maintenance and interchange of ribbon.

Apparently because of the lack of clear attention attracting visual indication of whether or not the machine is on, the unpleasantness and awkwardness of actuating a disk or knob back and forth, the inconvenience of locating and actuating an obscured on-off element by touch alone or a combination of these factors, it is quite customary for operators to leave power driven keyboard equipped office machines such as typewriters on for long periods when they are not in use and the operators are not at their desks. Apparently, the noise made by the motors of these machines is not a sufficient signal. In fact, reliance on motor noise as an indication that the machine is on is a decided disadvantage because these machines should be as quiet in operation as possible to minimize noise-induced operator fatigue. Since so long as the motors are running certain parts of the power train operate continuously, the practice of leaving the motor on materially reduces the over-all useful life of power driven office machines such as typewriters.

In some power actuated office machines it is customary to interlock the machine covers with the power input circuit to the motor so that opening of the cover automatically turns off the motor and prevents it from being turned on while the cover is open. This is desirable to prevent injury to an operator while changing the ribbon or cleaning the machine. In known machines, however, the motor can normally only be restarted after the cover is closed by reactuation of the manual on-off element. This is because the known on-off elements have either an on position or an off position and opening of the cover while the manually manipulatable element is in its on position will restore the on-off element to its off position where it will remain until again manually actuated to the on position. United States Letters Patent 2,568,002, issued Sept. 18, 1951 to H. J. Hart et al. for Cover Controlled Safety Switch Mechanism for Power Operated Typewriters or Like Machines is typical of such prior art arrangements. This arrangement is disadvantageous in that it makes it very difficult, if not impossible, for maintenance personnel to override the cover interlock arrangement to apply power to the machine while the cover is open. This is frequently necessary to fully inspect and analyze the condition of the machine and presents no danger in a machine of the type here involved when practiced by trained personnel such as typewriter repairmen. This maintenance difficulty in prior interlock arrangements for machines of this type has led certain manufacturers to avoid the use of cover interlocks altogether with resultant danger of injury to the operator while cleaning the machine or changing the ribbon due to her lack of detailed mechanical knowledge of the operation of the machine to safely perform these functions while power is on the machine. Of course, normally no injury results in such machines because the operator will manually turn the machine off before cleaning it or changing the ribbon. Unfortunately, occasionally an operator does not. While the resultant injury may not be serious, it can be temporarily quite painful.

With the foregoing considerations in view, the principal individual and collective objects of the present invention are to provide an improved power input control mechanism for keyboard equipped office machines such as typewriters and the like in which:

(a) the manipulatable element is conveniently located as a part of the keyboard itself;

(b) the manipulatable element is a depressable key which is operative in alternate successive strokes to enable and disenable the power input to the machine;

(c) a clearly visible and attention attracting indication of the on-off status of the machine is provided at the keyboard preferably at the on-off key;

(d) a cover interlock is provided which is independent of the manipulatable on-off element so that the latter will remain in its on position despite opening of the cover so that maintenance personnel can conveniently override the cover interlock and supply power to the machine when necessary for maintenance inspection or test purposes.

(e) like operator motions may be utilized to turn the machine off and on;

(f) alternate successive like actuations of an on-off key element are effective to enable and disenable power operation of the machine.

These and other objects of the present invention will become more fully apparent by reference to the appended claims and as the following detailed description proceeds in reference to the accompanying drawings:

FIGURE 5 is a view similar to FIGURE 2 of a second embodiment of the power input control mechanism of the present invention;

FIGURE 6 is a view similar to FIGURE 3 of the mechanism of the second embodiment of the present invention;

FIGURE 7 is a view similar to FIGURE 4 of the second embodiment of the present invention;

Figure 8:
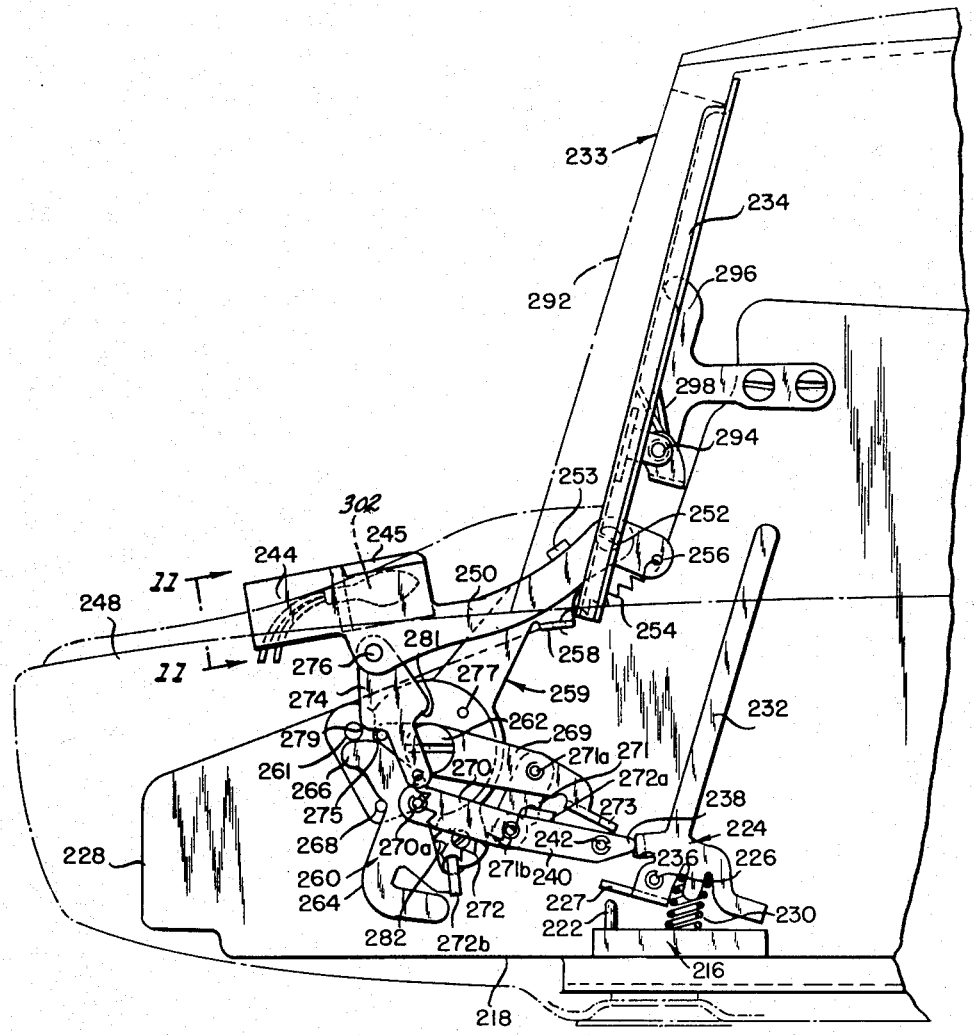
FIGURE 8 is a side elevational view of a further power input mechanism constituting a third embodiment of the present invention illustrating that mechanism in its off position.

FIGURE 10 is a fragmentary view of the mechanism of FIGURE 8 illustrating the manner in which the motor control switch is interlocked with the movable portion of the cover of the office machine to override the control by the manipulatable on-off element; and FIGURE 11 is a fragmentary view illustrating the interconnection between the manipulatable on-off element and the bistable mechanism controlled thereby constituting a view taken substantially along the line 11—11 of FIGURE 8.

Referring now in detail to the drawings and particularly to the embodiment shown in FIGURES 1–4, the electric motor 14 of the power actuated typewriter there illustrated is energized through a power circuit which is under the control of a snap-acting electrical switch 16 secured to the frame baseplate 18 by suitable screws 20. Switch 16 is of the normally open type requiring depression of its actuating pin or actuator 22 in opposition to an internal spring (not shown) to close its contacts. The pin 22 of switch 16 is under direct external control of a member 24 pivotally mounted upon a pivot stud 26 projecting from and fixed to the side of the machine side frame 28 above the switch 16. Member 24 is biased in a counter-clockwise direction about the pivot stud 26 by biasing means or compression spring 30 bearing at its bottom on the casing of switch 16 and surrounding a depending guide lug 31 integral with member 24. In the absence of either of two modes of restraint upon the member 24 as hereinafter explained, spring 30 will bias member 24 in a counter-clockwise direction about the pivot stud 26 to depress the pin 22, close the contacts of the switch 16 and thereby energize the drive motor and the on indicator lamp as hereinafter described.

This counter-clockwise motion of the member 24 under the influence of spring 30 may be restrained either due to the fact that the cover is open or due to the fact that the on-off control mechanism has been manually actuated to its off condition. The control of the member 24 due to the postion of the cover is effected through the upwardly extending arm 32 of the member 24 and its cooperation with the pivoted face mask 34 of the movable portion of the typewriter ribbon spool cover. The detailed structure and mounting of the cover of which mask 34 is a part is fully illustrated and described in the aforesaid copending application The coaction of the arm 32 of the member 24 with the mask 24 will be described in detail in connection with corresponding components of the embodiment illustrated in FIGURES 8–11, the coaction being substantially identical in all three embodiments illustrated in this application.

Control of the member 24 by the manually actuated on-off mechanism is effected by the coaction of a laterally extending ear 36 on member 24 with a rearwardly extending tip 38 of a lever 40 pivoted upon a stud 42 mounted on and projecting laterally from the side frame 28 parallel to post 26. With the lever 40 in the position illustrated in FIGURES 1, 2 and 4, its tip 38 lies in front of and blocks forward pivotal motion of the ear 36 and thereby prevents counter-clockwise pivotal motion of the member 24 about the pivot stud 26, thus maintaining switch 16 open.

The position of the lever 40 is controlled by a transfer device including a pair of interconnected bi-stable mechanisms under the control of the manipulatable on-off element or key 44 as will now be described. The upper portion 45 of key 44 is formed of light transmissive material and is disposed above a light source or electric lamp which is not shown in FIGURES 1–4, but which may be identical to and positioned in the same manner as the lamp 302 in the embodiment of FIGURE 8. The lamp is connected to be lighted when the motor is on and to be extinguished when the motor is off thus providing a clearly visible attention attracting indication of the on-off status of the machine.

Figure 1:
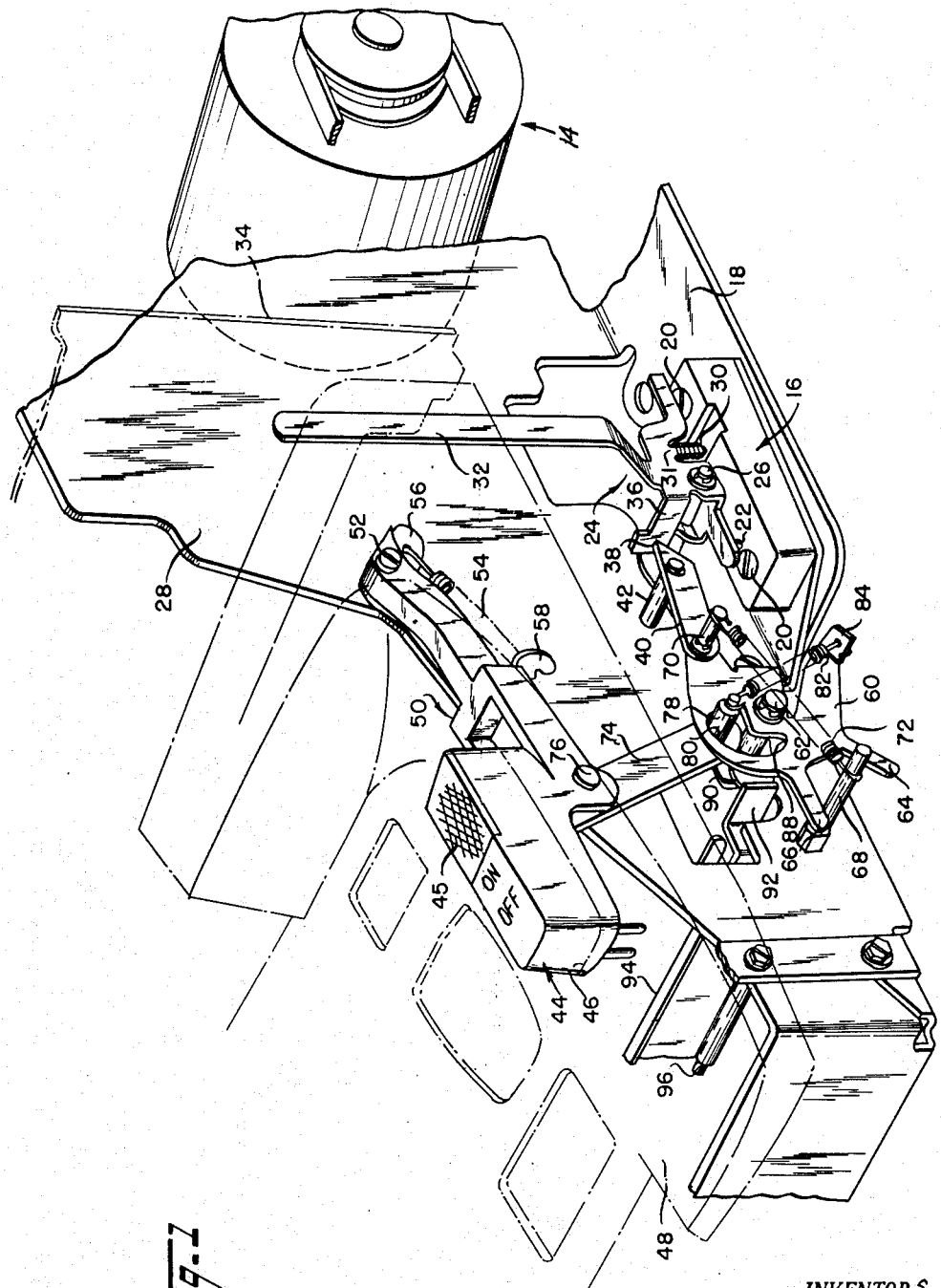
FIGURE 1 is a perspective view of a preferred embodiment of the power control mechanism of the present invention illustrated in its normal off condition and in its normal location at the right front corner of an office machine such as a typewriter at the right side of the keyboard thereof.

Key 44 is located to the right of the keys of the usual typewriter keyboard projecting upwardly through a complementary aperture 46 in the keyboard cover plate 48. The over-all general arrangement of the typewriter and typewriter keyboard of the machine, which is illustrated fragmentarily in FIGURE 1, is shown in co-pending application D 63,777 filed January 31, 1961, for Typewriter by David O. Chase et al. (which is now United States Design Patent No. 192,194). Key 44 is fixed to a lever 50 disposed beneath the cover plate 48 and pivotally mounted by a pivot stud or screw 52 upon the side frame 28, being resiliently biased in a clockwise direction about the stud 52 by a tension spring 54 connected between an ear 56 on lever 50 and a spring stud 58 fixed to the side frame 28.

A bi-stable member 60 is pivotally mounted upon a pivot stud 62 projecting laterally from and fixed to the side frame 28 for pivotal movement between predetermined limits defined by the coaction of the ears 64 and 66 of member 60 and the stud 68 fixed to the side frame 28 and projecting between the ears 64 and 66. Member 60 is connected for snap action over dead center movement to its opposite limit positions as will be explained presently. When member 60 is in the position shown in FIGURES 1, 2 and 4, switch 16 is open and the machine is off. When member 60 is in the position shown in FIGURE 3, the machine will be on if the member 24 is not restrained by cover mask 34. In the off position of member 60, its ear 66 is in engagement with stud 68 and in its on position, ear 64 is. Member 60 is interconnected to lever 40 by a stud 70 fixed to the rearward end of the member 60 and engaging an elongated slot 71 in the member 40 to form a conventional pin and slot connection.

Figure 2:
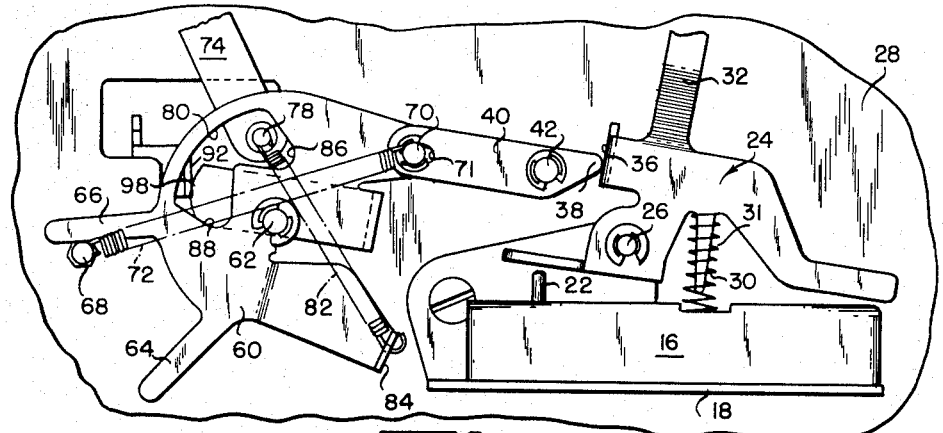
FIGURE 2 is a fragmentary side elevational view of the mechanism of FIGURE 1.

As is most clearly shown in FIGURE 2, a tension spring 72 is connected between the movable stud 70 and the fixed stop stud 68 and in the off position of member 60 extends above the axis of the pivot stud 62 upon which the member 60 is mounted to the side frame 28. Spring 72 thus biases member 60 in a counter-clockwise direction about the axis of pivot stud 62 and biases its ear 66 against the stop stud 68 when member 60 is in the off position illustrated in FIGURES 1, 2 and 4.

Referring again to FIGURE 1, member 60 is connected to the key lever 50 by a link 74 pivoted to key lever 50 by a pivot pin 76 and to member 60 by a motion transmitting member or stud 78 projecting through a generally arcuate aperture 80 in the member 60. With the key 44 in its undepressed position, the position of link 74 relative to the pivot stud 62 is established by a tension spring 82 extending between the stud 78 and a laterally projecting ear 84 on the member 60 beneath the pivot stud 62. When member 60 is in its off position, the line of action of spring 82 passes to the right of the axis of pivot stud 62 and when member 60 is in its on position the line of action of spring 82 lies to the left of pivot stud 62.

As is apparent from FIGURES 1 and 2, with member 60 in its off position, the linkage from ear 84 through spring 82, stud 78, link 74, pin 76, lever 50, and spring 54 adds a supplemental counter-clockwise biasing force to the member 60.

Figure 3:
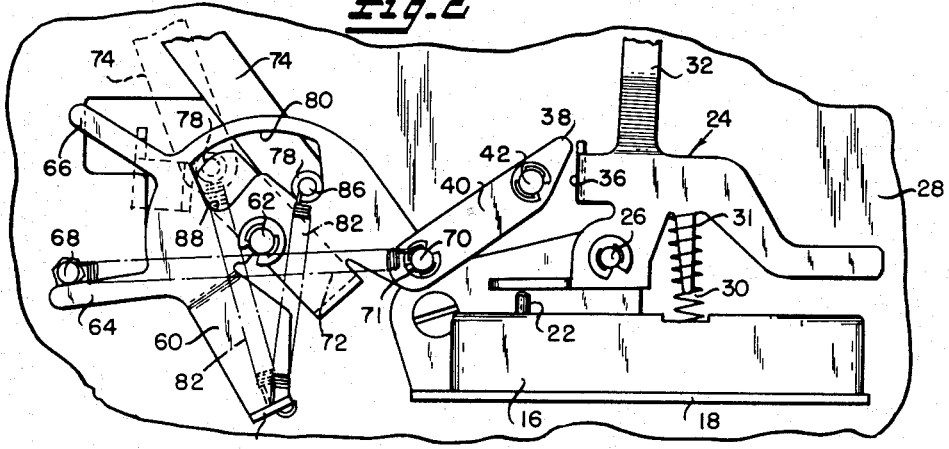
FIGURE 3 is a view similar to FIGURE 2 but illustrating in full lines the configuration of the mechanism when the on-off element has been actuated to shift the mechanism from its off condition to its on condition and in dotted lines the configuration of the mechanism in its on condition.

To turn the mechanism on member 60 must be pivoted from its FIGURE 2 position to its FIGURE 3 position. This removes the restraining action of tip 38 upon the member 24. When key 44 is depressed, it will pivot key lever 50 counterclockwise about its pivot screw 52, lowering link 74 to engage its stud 78 in the bottom of the notch 86 of the aperture 80 to pivot member 60 in a clockwise direction about its pivot stud 62. When member 60 is pivoted sufficiently that the line of action of spring 72 passes beneath the axis of stud 62, member 60 will snap to its FIGURE 3 position. As shown in FIGURE 3, when member 60 is in its on position, its ear 64 is in engagement with the stud 68 and the spring 72 interconnecting stud 70 with stud 68 passes beneath the axis of the pivot stud 62 to thereby bias the member 60 in a clockwise direction about the axis of pivot stud 62. Upon release of finger pressure upon the key 44, link 74 will restore upwardly under the influence of spring 54 to the phantom line position illustrated in FIGURE 3 in which the line of action of the associated spring 82 passes to the left of the pivot stud 62 thereby also tending to bias member 60 in a clockwise direction. As the member 60 is pivoted in a clockwise direction from its FIGURE 2 position to its FIGURE 3 position, lever 40 is pivoted in a counter-clockwise direction about its pivot stud 42 to lift its tip 38 above the path of motion of the laterally projecting ear 36 on the member 24 thereby freeing the member 24 for counter-clockwise pivotal movement about its pivot stud 26 to depress the switch pin 22 so long as it is not restrained by the cover mask 34 as will be explained hereinafter in connection with the third embodiment. It will be noted that components of this on-off mechanism as shown in FIGURE 3 are in a second stable state. They will remain there until the key 44 is again depressed.

Figure 4:
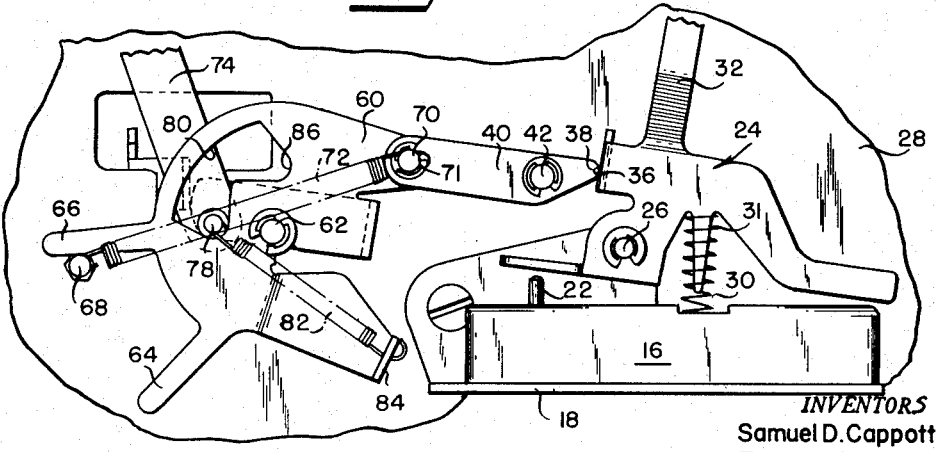
FIGURE 4 is a view similar to FIGURE 2 but illustrating the mechanism of the first embodiment in its configuration when the off-on manipulatable element has been actuated to shift the mechanism from its on condition to its off condition.

In the FIGURE 3 configuration of the mechanism, pin 78, upon release of finger pressure upon the key 44 to permit the link 74 to restore to its released position as illustrated in phantom lines, is moved by spring 82 from its position in engagement with the notch 86 to a position in which it is in alignment with notch 88 at the opposite side of the pivot stud 62. It is maintained in this position by the tension spring 82 until key 44 is again actuated. When key 44 is again depressed, stud 78 will bottom in notch 88 and exert a counter-clockwise turning force upon the member 60 about the axis of pivot stud 62. Continued pressure upon the key 44 will pivot member 60 in a counter-clockwise direction, first manually and then by action of spring 72, to move it until its ear 66 again contacts stop stud 68 as illustrated in FIGURE 4. In this position, the members 40 and 60 have again been pivoted to their blocking or off positions. Upon release of finger pressure upon the key 44, link 74 and key lever 50 restore to their FIGURE 1 position under the influence of the tension force of spring 54 and the entire mechanism is restored to its off position.

Thus by alternate successive depressions of the key 44, switch 16 may be turned on and then off. With this mechanism in its on position, it exerts no restraining force upon the member 24 at all. Opening of the cover will open switch 16 but has no effect upon this mechanism. The effect is solely upon the position of the member 24.

If a repairman wishes to restore power to the machine while the cover is open, he can do so by leaving the mechanism controlled by key 44 in its on configuration and merely pivoting the face mask 34 to a position in which it will permit member 24 to close the switch 16.

Member 60 has a parallel arm 90, best shown in FIGURE 1, which, in the position of member 60 shown in FIGURES 1, 2 and 4, lies to the rear and in blocking position with respect to an ear 92 which forms a lateral extension of a bail 94 pivoted upon a shaft 96 and extending across the keyboard immediately below the key levers. Bail 94 is illustrated in its key lever blocking position. In this position it is impossible to depress any of the keys on the keyboard. Bail 94 is resiliently biased by a spring (not shown) in a clockwise or rearward direction about the axis of its pivot shaft 96. So long as the portion 90 of the member 60 is in the position shown in FIGURES 1, 2 and 4, bail 94 cannot pivot to free the key levers. When member 60 is pivoted in a clockwise direction to its position illustrated in FIGURE 3, its cam surface 98 is moved upwardly away from the ear 92 of the bail 94 and permits bail 94 to pivot sufficiently in a clockwise direction to free the key levers. Restoration of member 60 in a counter-clockwise direction to its FIGURES 1, 2 and 4 position moves cam surface 98 into engagement with ear 92 to shift bail 94 to its keyboard locking position as illustrated in FIGURES 1, 2 and 4.

*Second embodiment*

The second embodiment of the present invention, illustrated in FIGURES 5-7, is in many respects substantially structurally and functionally identical with that of the first embodiment. For simplicity, the parts of the second embodiment have been assigned reference numerals 100 higher than those assigned to the parts to which they correspond in the first embodiment. Only the distinguishing characteristics will be herein explained in detail.

Referring to FIGURE 5, the mechanism is actuated by a link 174 connected to a spring biased pivoted key (not shown) in exactly the same way as shown in FIGURE 1. Link 174 has a stud 178 which, upon depression of link 174, bottoms in either notch 186 or 188 in the member 160, pivoted on a pivot stud 162, depending upon the position of spring 182 with respect to the axis of pivot stud 162 as determined by the position of ear 184 on the member 160. When ear 184 is in its FIGURE 5 position, depression of link 174 will engage stud 178 with notch 186 to pivot member 160 clockwise about stud 162 and when ear 184 is in its FIGURE 6 position, depression of the link will bottom the stud 178 in the notch 188 to pivot member 160 in a counter-clockwise direction about pivot stud 162. The limits of pivotal motion of the member 160 are determined by the alternative engagement of the ears 164 and 166 with the spring stud 168 disposed therebetween.

Switch 116 is controlled by a member 124 pivotally mounted upon a pivot stud 126 as in the previous embodiment. In this embodiment, however, the spring (not shown) internally of the switch 116 which biases the pin 122 upwardly is stronger than the spring 130 which biases the member 124 in a counter-clockwise direction about the pivot stud 126. As in the previous embodiment depression of the pin 122 will close the switch 116. Member 124 is controlled through its upwardly extending arm 132 by the cover front mask as in the first and third embodiments. Member 124 is, however, provided with a forwardly extending arm 127 projecting beneath and into the path of motion of the spring stud 170 and the member 160. When the member 160 is pivoted to its clockwise limit position as illustrated in FIGURE 6, the spring stud 170 engages the forwardly extending arm 127 to pivot the member 124 in a counter-clockwise direction about its pivot stud 126 in opposition to the clockwise biasing force of the spring (not shown) internally of switch 116 to close the switch 116. In this embodiment, if the cover should be opened while the mechanism is in its FIGURE 6 configuration, the spring biasing the cover front mask to its open position is sufficiently strong to pivot the member 124 in a clockwise direction and through its arm 127 to restore the member 160 in a counter-clockwise direction about its pivot stud 162 to its FIGURE 5 position. For this reason, while the embodiment of FIGURES 5, 6 and 7 is structurally slightly less complex than that of the first embodiment, it is considered less desirable.

With the mechanism in its on position as shown in FIGURE 6, a second depression of the key to depress the link 174 will engage its stud 178 with notch 188 as shown in FIGURE 7 to pivot the member 160 in a counter-clockwise direction to disengage the stud 170 from the forward extension 127 of member 124 and permit the switch 116 to open.

With the foregoing exceptions the structure and operation of the mechanism shown in this second embodiment are the same as that in the first embodiment.

*Third embodiment*

The third embodiment is shown in FIGURES 8–11. As in the first embodiment, the electric motor (not shown) of the power actuated typewriter there illustrated is energized through a power circuit which is under the control of a snap-acting switch 216 secured to the frame baseplate 218 by suitable screws (not shown). Switch 216 is of the normally open type requiring depression of its actuating pin or button 222 to close its contacts. The pin 222 of switch 216 is under direct control of a member 224 pivotally mounted upon the machine side frame upon a pivot stud 226 projecting from and fixed to the side of the machine side frame 228 above the switch 216. Member 224 is biased in a counter-clockwise direction about the pivot stud 226 by compression spring 230. In the absence of restraint upon the member 224, as hereinafter explained, spring 230 will bias member 224 in a counter-clockwise direction about the pivot stud 226 to depress the pin 222 and close the contacts of the switch 216.

This counter-clockwise motion of the member 224 under the influence of spring 230 may be restrained either due to the fact that the ribbon spool cover 233 (that is the movable portion of the machine cover) is open as shown in FIGURE 10 or due to the fact that the on-off mechanism has been manually actuated to its off condition. The control of the member 224 due to the position of the cover is effected through the upwardly extending arm 232 of the member 224 in its cooperation with the pivoted face mask portion 234 of ribbon spool cover 233. The detailed structure and suspension of the cover 233 of which mask 234 is a part is fully illustrated and described in the aforesaid co-pending application of Paone. The coaction of the arm 232 of the member 224 with the mask 234 will be described in detail presently.

Control of the member 224 by the manually actuated on-off mechanism is effected by the coaction of a laterally extending ear 236 on member 224 with a rearwardly extending tip 238 of a lever 240 pivoted upon a stud 242 mounted on the side frame 228. With the lever 240 in the position illustrated in FIGURE 8, its tip 238 lies in front of and blocks forward pivotal motion of the ear 236 and thereby prevents counter-clockwise pivotal motion of the member 224 about the pivot stud 226.

The position of the lever 240 is controlled by a transfer device including a pair of bi-stable mechanisms under the control of the manipulatable on-off element or key 244 as will now be described. Key 244 projects upwardly through a complementary aperture in the keyboard cover plate 248. It is fixed to a lever 250 disposed beneath the cover plate 248. Lever 250 is pivotally mounted by a pivot stud or screw 252 upon the side frame 228, being normally resiliently biased in a clockwise direction about the stud 252 against a stop 253 by a tension spring 254. Spring 254 is connected between the ear 256 on lever 250 and a fixed spring support ear 258 projecting laterally from a bracket 259 fixed to the side frame 228 by screws 261.

Figure 9:
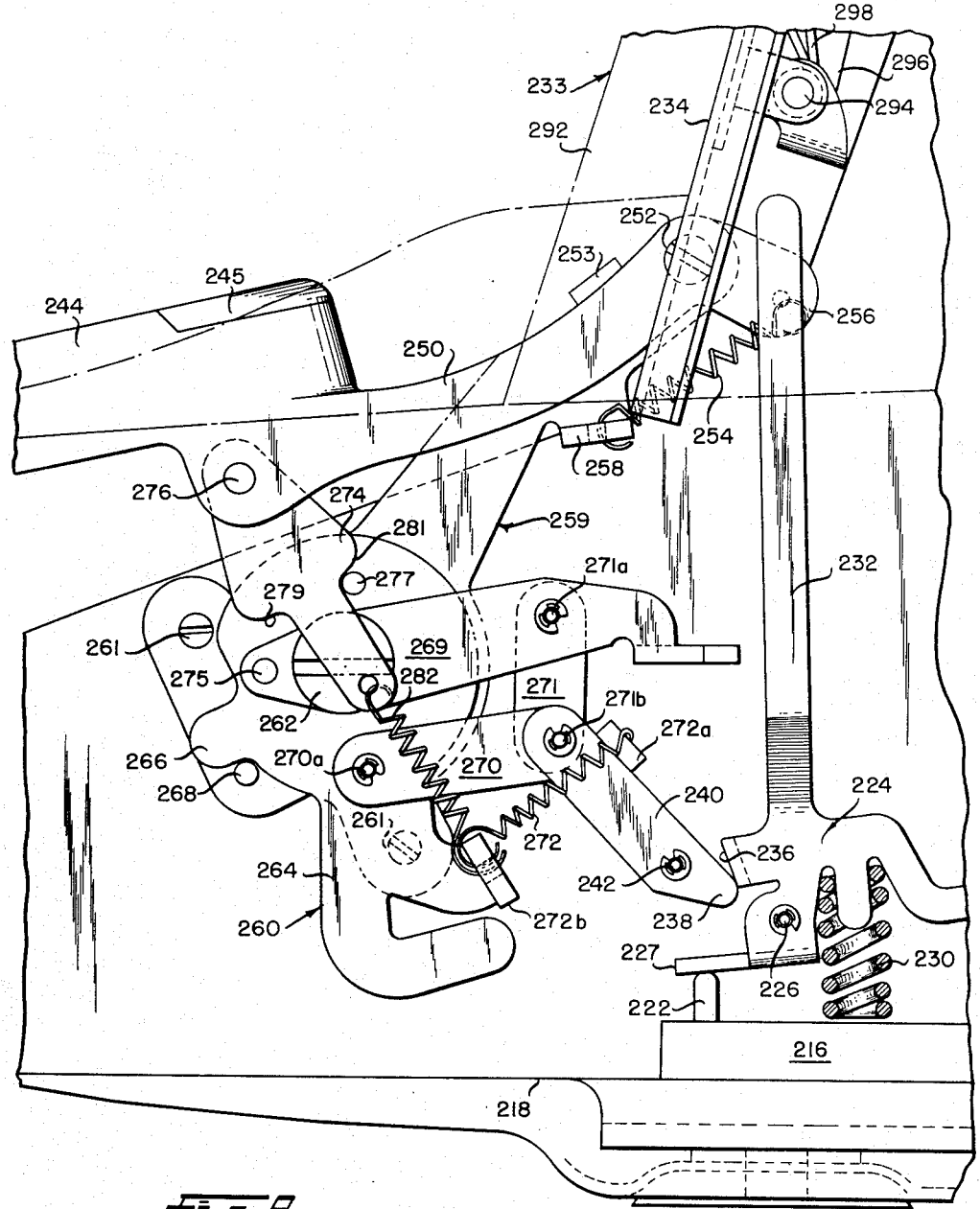
FIGURE 9 is a view similar to FIGURE 8 illustrating that mechanism in its on condition.

A member 260 is pivotally mounted upon a pivot screw 262 fixed to and projecting laterally from the side frame mounted bracket 259. The limits of pivotal motion of the member 260 about the axis of the pivot screw 262 are defined by the coaction of its projections 264 and 266 with a stud 268 fixed to the frame mounted bracket 259 and extending between the projections 264 and 266. In the off position of the mechanism as shown in FIGURE 8, projection 264 is in engagement with post 268. Member 260 is connected to lever 240 by a linkage comprising a first link 269 pivoted on screw 262, a second link 270 pivoted on member 260 by a pivot stud 270a, and a link 271 interconnecting links 269 and 270 and pivotally connected thereto by pivot studs 271a and 271b respectively. As is most clearly shown in FIGURES 8 and 9, a tension spring 272 is tensioned between an ear 272a and an ear 272b integral with lever 240 and member 260 respectively. With the mechanism in its off position of FIGURE 8, the line of action of spring 272 passes above the axis of pivot stud 271b to bias lever 240 counter-clockwise about pivot stud 242 and links 270 and 269 clockwise about stud 270a and screw 262 respectively. Ear 273 integral with link 269 abuts the upper edge of lever 240 as is shown in FIGURE 8 to positively limit the motion of this linkage under the biasing action of spring 272 in this direction. This action biases member 260 clockwise about screw 262 to the position in which its projection 264 abuts fixed stop stud 268. When the mechanism is in its on position as shown in FIGURE 9, the line of action of spring 272 is beneath the axis of pivot stud 271b. In this position, spring 272 biases member 260 counter-clockwise about screw 262 until its projection 266 abuts stop stud 268 and simultaneously biases lever 240 counter-clockwise about stud 242.

Member 260 is connected to the key lever 250 by a link 274 pivoted to key lever 250 by a pivot shaft 276 (see FIGURE 11) and a tension spring 282 connected between the bottom of link 274 and ear 272b. Spring 282 establishes the position of link 274 relative to the axis of pivot screw 262. When the mechanism is in its off position of FIGURE 8, the line of action of spring 282 is to the left of the axis of screw 262 and link 274 is biased against a pin 275 fixed to and projecting from the link 269 to the left of its pivot connection to screw 262. When the mechanism is in its on position of FIGURE 9, the line of action of spring 282 passes to the right of the axis of screw 262 and biases link 274 against pin 277 fixed to member 260.

As is apparent from FIGURES 8 and 9, the linkage from ear 272b through spring 282, link 274, shaft 276, lever 250, and spring 254 adds a supplemental clockwise biasing force about the axis of screw 262 to the member 260 when the mechanism is in the off configuration as illustrated in FIGURE 8 and a supplemental counter-clockwise biasing force to member 260 when the mechanism is in its on configuration as illustrated in FIGURE 9.

To turn the mechanism on (to shift it from its FIGURE 8 configuration to its FIGURE 9 configuration), that is to remove the restraining action of tip 238 upon the member 224, the key 244 is depressed. As is apparent from FIGURES 8 and 9, depression of the key 244 will pivot key lever 250 counter-clockwise about its pivot screw 252, lowering link 274 to engage its surface 279 with the pin 275 to pivot member 260 in a counter-clockwise direction about its pivot screw 262. This counter-clockwise motion of member 260 shifts spring 272 past its dead center position with respect to the axis of stud 271b so that the mechanism snaps to the position shown in FIGURE 9 in which the projection 266 of member 260 is in engagement with the stud 268 and the line of action of spring 272 passes beneath the axis of the pivot stud 271b to thereby bias the member 260 in a counter-clockwise direction about the axis of pivot screw 262. Upon release of the pressure upon the key 244, link 274 will restore under the influence of spring 254 to the position illustrated in FIGURE 9 in which the associated spring 282 passes to the right of the pivot screw 262 thereby also tending to bias member 260 in a counter-clockwise direction. As the member 260 pivots in a counter-clockwise direction from its FIGURE 8 position to its FIGURE 9 position, lever 240 is pivoted in a clockwise direction about its pivot stud 242 to lower its tip 238 out of the path of motion of the laterally projecting ear 236 on the member 224 thereby freeing the member 224 for counter-clockwise pivotal movement about its pivot stud 226 to depress the switch pin 222 so long as member 224 is not restrained by the cover mask 234 as will be explained shortly. It will be noted that as shown in FIGURE 9 the elements of the entire mechanism are in a second stable state. They will remain there until the key 244 is again depressed or the cover 233 opened. In the FIGURE 9 configuration of the mechanism, release of finger pressure upon the key 244 permits the link 274 to restore to its released position in which its shoulder surface 281 is in alignment with pin 277. Link 274 is maintained in this position by tension spring 282. Thus when key 244 is again depressed, stud 276 will force shoulder surface 281 against pin 277 to impart clockwise turning force to the member 260 about the axis of pivot screw 262. Continued pressure upon the key 244 will pivot member 260 in a clockwise direction to move it until spring 272 again passes its dead center position with respect to pivot stud 271b and snaps projection 264 into contact with stop stud 268 as illustrated in FIGURE 8. In this position, the lever 240 has again been pivoted to its locking or off position and upon release of pressure from the key 244, link 274 and key lever 250 restore to their FIGURE 8 positions under the influence of the tension force of spring 254 and the entire mechanism is restored to its off position. Thus by alternate successive depressions of the key 244, switch 216 may be turned on and then off.

The keyboard interlock mechanism may be substantially the same as that illustrated and described above in connection with the first embodiment.

Referring now to FIGURES 8 and 10, the movable portion of the cover 233 has two parts: a front mask 234 and a main portion 292. Mask 234 is pivoted at 294 between a pair of brackets 296 fixed to the machine side frames and biased in a counter-clockwise direction as viewed in FIGURES 8 and 10 by a torsion spring 298. The main portion 292 is mounted for movement between a closed position as shown in FIGURE 8 in which it restores mask 234 to the position there illustrated and an open position shown in FIGURE 10 in which mask 234 is free to pivot to the position shown in FIGURE 10. Mask 234 can be manually restored to its FIGURE 8 position while the main portion 292 is open. This mechanism is fully disclosed in the aforesaid Paone application.

As is most clearly shown in FIGURE 10, mask 234 at its right hand side as viewed from the front of the machine has a vertical slot 300 which is in alignment with the upward extension 232 of member 224. As is apparent from FIGURE 10, with mask 234 in its open position, it pivots member 224 clockwise sufficiently to disengage pin 222 of switch 216 to permit switch 216 to open, disenable the drive motor and extinguish the motor "on" indicator lamp 302 (see FIGURE 8) shining through the translucent rear portion 245 of key 244. In doing so, lever 240 and the associated components of the on-off mechanism all will remain in their on positions if on when the cover is opened and in their off positions if off when the cover was opened. In FIGURE 10, they are shown in their on positions with the cover open.

The invention may be embodied in other specific forms without departing from the spirit or essential characteristics thereof. The present embodiments are therefore to be considered in all respect as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. On-off mechanism for a keyboard equipped power actuated office machine having a motor and a plurality of key activated instrumentalities comprising:
   (a) a manipulatable on-off element;
   (b) a switch adapted to be electrically connected to said motor;
   (c) a member movable between first and second positions to activate and deactivate said motor by closing and opening said switch;
   (d) means biasing said member to said first position;
   (e) a transfer device operatively connected to said on-off element and comprising a lever movable alternately between first and second limit positions by successive like movements of the on-off element, said lever being engageable with said movable member as said lever moves from its first limit position to its second limit position to move said member from its first position to its second position against the force exerted on said member by said biasing means and effective in said second limit position to maintain said member in its second position and said lever being spaced from said member in its first limit position to allow said biasing means to move said member to its first position and close said switch;
   (f) a machine cover having a portion movable between closed and open positions; and
   (g) means responsive to opening movement of said movable cover portion for moving said member to its second position against the force exerted by said biasing means to thereby open said switch, said last-named means operating independently of the manipulation of the on-off element.

2. The mechanism defined in claim 1 wherein said on-off element comprises a key on the keyboard of said machine.

3. The mechanism defined in claim 1 wherein said cover movable portion movement responsive means includes a manually actuatable element for restoring control over said switch to said element responsive means while said cover movable portion is in its control overriding position.

4. The mechanism defined in claim 1 wherein an electric lamp is disposed adjacent said manipulatable on-off element and is connected for energization with said motor.

5. The mechanism defined in claim 4 wherein said on-off element has a light transmitting portion and wherein said lamp is disposed to direct light through said on-off element light transmitting portion when energized to indicate the machine is on.

6. The mechanism defined in claim 1 wherein said on-off element is positioned on said keyboard at one side of the instrumentality activating keys thereof whereby said machine can be turned on and off by the operator thereof.

7. The mechanism as defined in claim 1, together with second means mechanically connected to said on-off element and responsive to alternate successive like movements of said element to enable and disenable the keys of the keyboard of said machine.

8. The mechanism as defined in claim 1, together with:
   (a) means mounting said on-off element and pivotable between an elevated position and a depressed position; and
   (b) means biasing the mounting means to its elevated position.

9. On-off mechanism for a keyboard equipped power actuated office machine having a motor and a plurality of key activated instrumentalities, comprising:
   (a) a manipulatable on-off element;

(b) means responsive to successive like movements of said element to alternately activate and deactivate said motor, comprising:
  (1) a switch adapted to be electrically connected to said motor;
  (2) a bi-stable member operatively associated with said on-off element and movable between first and second limit positions;
  (3) means including said manipulatable on-off element and means operable by successive like movements of said on-off element for shifting said bi-stable member back and forth between its limit positions, said last-named means including a motion transmitting member operatively engageable with said bi-stable member and means incorporated in said bi-stable member for controlling the point at which said motion transmitting member engages the bi-stable member;
  (4) a lever movable relative to said bi-stable member;
  (5) means for so interconnecting said bi-stable member and said lever that each transfer of said bi-stable member between its two limit positions will produce a corresponding shift of said lever between first and second limit positions thereof;
  (6) a member movable between first and second limit positions to open and close said switch and thereby activate and deactivate said motor and so positioned relative to said lever as to be engaged and maintained in its first switch opening limit position by said lever in the first limit position thereof and as to be free to move to its second switch closing limit position with said lever in the second limit position thereof; and
  (7) means biasing said movable member to its second switch closing limit position; and
(c) means operable independently of the movement of the on-off element for moving said movable member to said second limit position against the force exerted by said biasing means.

10. The mechanism as defined in claim 9, wherein:
(a) said transfer device further comprises a bi-stable member having first and second distinct stable conditions with respect to said on-off element such that successive actuations of said element will shift said bi-stable member between its two stable conditions; and
(b) means so interconnecting said bi-stable member and said lever that each transfer of said bi-stable member between its two stable conditions will produce a corresponding shift of said first lever between its limit positions.

11. On-off mechanism for a keyboard equipped, power actuated office machine having a plurality of key activated instrumentalities and a motor for operating said instrumentalities, comprising:
  (a) a manipulatable on-off key mounted for movement between an elevated position and a depressed position;
  (b) means biasing said key to its elevated position; and
  (c) means responsive to successive depressions of said key to alternately activate and deactivate said motor, comprising:
    (1) a switch adapted to be electrically connected to said motor and having an actuator movable between first and second positions to open and close the switch contacts;
    (2) means including a pivotally mounted member operatively connected to the switch actuator and movable between first and second limit positions to open and close said switch by moving said actuator between its first and second positions;
    (3) means including a pivotally mounted bi-stable member alternately movable between first and second limit positions by successive depressions of said key operatively interposed between said key and said member for moving said member between its first and second limit positions; and
    (4) at least one overcenter spring biasing said pivotally mounted bi-stable member to the limit position toward which it is moved by depression of said key; and
  (d) means operative independently of the depression of the on-off key to move said pivotally mounted member to its first position to thereby effect movement of said switch actuator to its first position to open said switch.

12. The mechanism as defined in claim 11, wherein said independently operative means comprises a machine cover having a portion movable between closed and open positions, said movable cover portion being so positioned and movable in a cover opening direction relative to said pivotally mounted member as to directly engage and pivot said member to the switch opening limit position thereof regardless of the limit position to which said member has been pivoted by depression of said on-off key.

13. The mechanism defined in claim 12 wherein said cover movable portion movement responsive means includes a manually actuatable element for restoring control over said switch to said key responsive means while said cover movable portion is in its open position.

References Cited by the Examiner
UNITED STATES PATENTS

| | | | |
|---|---|---|---|
| 588,428 | 8/1897 | Heck | 200—67 |
| 2,255,029 | 9/1941 | Tholstrup | 197—193 X |
| 2,407,195 | 9/1946 | Voz Reppert | 197—17 |
| 2,568,002 | 9/1951 | Hart et al. | 197—17 |
| 2,810,466 | 10/1957 | Lambert et al. | 197—17 |

ROBERT E. PULFREY, *Primary Examiner.*